United States Patent [19]

Stieg et al.

[11] Patent Number: 4,493,221

[45] Date of Patent: Jan. 15, 1985

[54] VARIABLE SPEED, BELT DRIVEN TRANSMISSION SYSTEM, SPEED SENSING DRIVER PULLEY AND METHOD

[75] Inventors: Richard F. Stieg, Boulder; John P. Dolan, Littleton; W. Spencer Worley, Aurora; Tristan Juergens, Conifer, all of Colo.

[73] Assignee: The Gates Rubber Company, Denver, Colo.

[21] Appl. No.: 457,338

[22] Filed: Jan. 12, 1983

[51] Int. Cl.³ .................... F16M 55/52; B60K 41/04
[52] U.S. Cl. ........................................ 474/14; 474/11; 474/46; 74/856
[58] Field of Search ................. 474/11, 12, 13, 14, 474/46; 74/856, 861, 862

[56] References Cited

U.S. PATENT DOCUMENTS

| | | |
|---|---|---|
| 2,117,485 | 5/1938 | Lewellen et al. ........................ 474/14 |
| 2,795,962 | 6/1957 | Uher ........................................ 474/14 |
| 3,534,622 | 10/1970 | Johnson ................................. 474/12 |
| 3,600,960 | 8/1971 | Karig et al. ............................ 474/12 |
| 3,850,050 | 11/1974 | Lemmens ............................... 474/12 |
| 4,284,408 | 8/1981 | Boer et al. .............................. 474/14 |

FOREIGN PATENT DOCUMENTS

| | | | |
|---|---|---|---|
| 875582 | 9/1942 | France | 474/11 |
| 1249367 | 11/1960 | France | 474/14 |

Primary Examiner—Rodney H. Bonck
Assistant Examiner—Michael David Bednarek
Attorney, Agent, or Firm—H. W. Oberg, Jr.; C. H. Castleman, Jr.

[57] ABSTRACT

A method for shifting a transmission with a predominantly mechanical speed sensing actuator to within a 10 percent shifting zone around a chosen operating line on an engine rpm/torque map by matching the force balance of the driver pulley to a force balance on the driven pulley.

A variable speed belt drive transmission system with a predominantly mechanical speed sensing driver pulley and a torque sensing driven pulley that responds to an operating line, monotonic in torque having a slope from about 0.004 lb-ft/rpm to about 0.060 lb-ft/rpm where the driver pulley has an actuator that controls speed for a chosen torque value. The actuator has at least one centrifugal weight connected to an end of a torque producing spring to wind the spring. A second end of the spring is operatively connected through an articulated linkage to a movable half of the pulley such that the generated axial force is not directly proportional to square of the speed.

5 Claims, 10 Drawing Figures

VARIABLE SPEED, BELT DRIVEN TRANSMISSION SYSTEM, SPEED SENSING DRIVER PULLEY AND METHOD

BACKGROUND OF THE INVENTION

The invention relates to variable speed belt driven transmission systems, but more particularly, the invention relates to speed sensing pulleys and methods for improving axial forces at the driver pulley of the transmission for improved shifting characteristics.

Adjustable speed V-belt drives are variable speed belt transmission systems which are either manually or automatically regulated. Belt driven transmissions are used in various machinery such as agricultural equipment, snowmobiles, automobiles and industrial equipment. The drives are powered at some peak load by some source such as a motor, and may be required to deliver power at various speed ratios and torques to a constantly changing output load. In automotive applications, for example, an internal combustion engine having peak and transient torque charcteristics, delivers power at various speed ratios through a transmission to vehicle wheels that react to changing road loads (e.g., windage, hills, and speed). Belt driven transmissions customarily are designed to automaticaly shift to accommodate changing road loads.

The prior art is replete with examples of automatic pulley shifters or actuators that are either speed responsive, torque responsive, or combinations thereof. The shifters may be mechanically operated, electrically operated, pneumatically or hydraulically operated. A speed responsive system may use centrifugal fly weights, and a torque responsive system may use an actuator with a helical torque ramp or a hydraulic pressure that is generally related to torque. This invention is primarily directed to a predominantly mechanically controlled belt driven transmission system which uses a torque sensing driven pulley and a speed sensing driver pulley.

In some transmission applications, it is desirable that a variable speed belt transmission approach shifting at a constant input speed and thereby transmit constant power. To do this, axial forces at the speed sensing driver pulley must be balanced through a variable speed belt to axial forces at a predominantly torque sensing driven pulley. The degree of variance of a transmission from shifting at a constant speed depends on how well the driver pulley axial forces are balanced against the driven pulley axial forces through an interconnecting variable speed belt. The degree of driver pulley, driven pulley axial force mismatch is reflected in variations of shifting speed. Predominantly mechanically operated transmissions have variations in shifting speed as high as 20 percent of a desired shifting speed. The difficulty with prior art variable speed drives of not being able to closely approach shifting at a constant speed is caused by the axial forces of a predominantly mechanically operated driver pulley not being matched in a force balance to the axial forces of a torque sensing driven pulley.

There are several references that analyze axial forces of variable speed V-belt drives. B. G. Gerbert has published several papers on variable speed drives and some of his works are: (1) "Force and Slip Behavior and V-belt Drives." "Acta Polytechnica Scandinavica, MECH."-A&G., Series No. 67, Helsinski, 1972; (2) "Adjustable Speed V-belt Drives-Mechanical Properties and Design." SAE Paper 740747 (1974); (3) "Doctors Thesis on V-belt Drives With Special Reference to Force Conditions, Slip, and Power Loss." Lund Technical University, Lund, Sweden, (1973); and (4) "A Complimentary Large Slip Solution in V-belt Mechanics." ASME Paper 77-DET-162 (1977).

Reference (1) Supra, analyzes various types of adjustable speed V-belt drives and at page 5, example 5, a driven pulley with a torque ramp for closing the pulley halves together responsive to rotational changes is discussed in conjunction with FIG. 3 showing driven pulley axial forces as a function of the coefficient of traction. The axial force/coefficient of traction chart is useful for showing axial force, tension interrelationship for a variable speed belt drive. Dimensionless axial-force, $F/(T_1+T_2)$ where F is axial force, $T_1$ is tight side load tension and $T_2$ is slack side belt tension, is scaled on the ordinate and traction ratio $(T_1-T_2)/(T_1+T_2)$, is scaled on the abcissa. Such charts show that dimensionless axial force at the driven pulley is generally within a constant band for all traction ratios and speed ratios. Comparatively, dimensionless axial force at the driver pulley drastically increases with traction ratio for all speed ratios. Thus, the axial forces at the driven pulley generally define the total tension $(T_1+T_2)$ in the drive as well as the force available to produce torque $(T_1-T_2)$ for transmitting power. The charts shows the interrelationship for matching driver pulley to driven pulley axial forces for any given traction ratio and where the driver pulley axial forces are generally greater than the driven pulley axial forces except at low traction ratios. Of course, the interrelationship between axial force and a traction ratio is influenced by belt design, pulley diameter, and pulley center distance. These interrelationships are also discussed in the above references.

SUMMARY OF THE INVENTION

In accordance with the invention, a V-belt driven transmission, method, and speed responsive pulley are provided for control of pulley axial forces that permit a transmission to more closely approach shifting at a constant speed. Under the method aspect of the invention, an operating line, monotonic in torque, is chosen that has a slope from about 0.004 lb-ft/rpm to about 0.060 lb-ft/rpm. Driven pulley axial forces that impede belt slip are provided by a torque sensing actuator. Driver pulley axial forces that approach force balance matching to driven pulley axial forces at specific traction ratios, and specific speeds are provided by an actuator with speed sensing, centrifugal weights. The centrifugal weights wind up torque producing springs, such as clock-type springs that are interconnected to an articulated linkage. The springs tailor the force effect of the centrifugal weights so as to match the driver pulley axial forces against generated driven pulley axial forces. Linkage limit stops and the secondary centrifugal weights optionally may be used to further tailor the speed sensing pulley axial forces.

A V-belt transmission system is provided where the driver pulley has an actuator with means for closing the driver pulley halves together over the shifting range of the transmission at an axial force that is from about 80 to about 120 percent, and more preferably from 95 to about 105 percent, of the theoretically required speed sensitive force to match the generated force of a torque sensing driven pulley.

An actuator of the invention has centrifugal weights that each wind up one end of a torsional type clock spring. The other end of the spring connects to move an articulated linkage that axially reciprocates a movable pulley half with variable axial force.

One aspect of the invention is to provide a mechanical V-belt transmission system designed for shifting at closer to constant speeds than mechanical transmission systems of the prior art.

Another aspect of the invention is to provide a method for matching axial forces of a driver and driven pulley by tailoring the axial force of the driver pulley with a centrifugal weight and torsional spring over the transmission's shifting speed range.

Another aspect of the invention is to provide a speed sensing pulley actuator.

These and other aspects of the invention are described with reference to the Figures wherein.

DESCRIPTION OF PREFERRED EMBODIMENT

Major V-belt manufacturers, variable speed drive manufacturers, and others skilled in the V-belt art have digital or analog computer programs that model variable speed belt drives. The programs are useful tools for predicting, analyzing, and designing variable speed belt drives. While all such programs are not the same because of different emphasis placed on items such as coefficients of an equation, all must include an analysis that considers driver pulley axial forces, driven pulley axal forces, V-belt tight side tension, V-belt slack side tension, V-belt size, pulley diameters for some speed ratio, pulley center distance, and some maximum or peak torque load at the driver pulley. Absent a computer program, several references are available for analyzing the interrelationships of such parameters. For example, reference (2) supra, gives a good mathematical analysis of variable speed belt drives and is included in the file history hereof. Some of the charts shown herein are developed with the aid of a computerized mathematical model of variable speed drives.

Method

Figure 1:
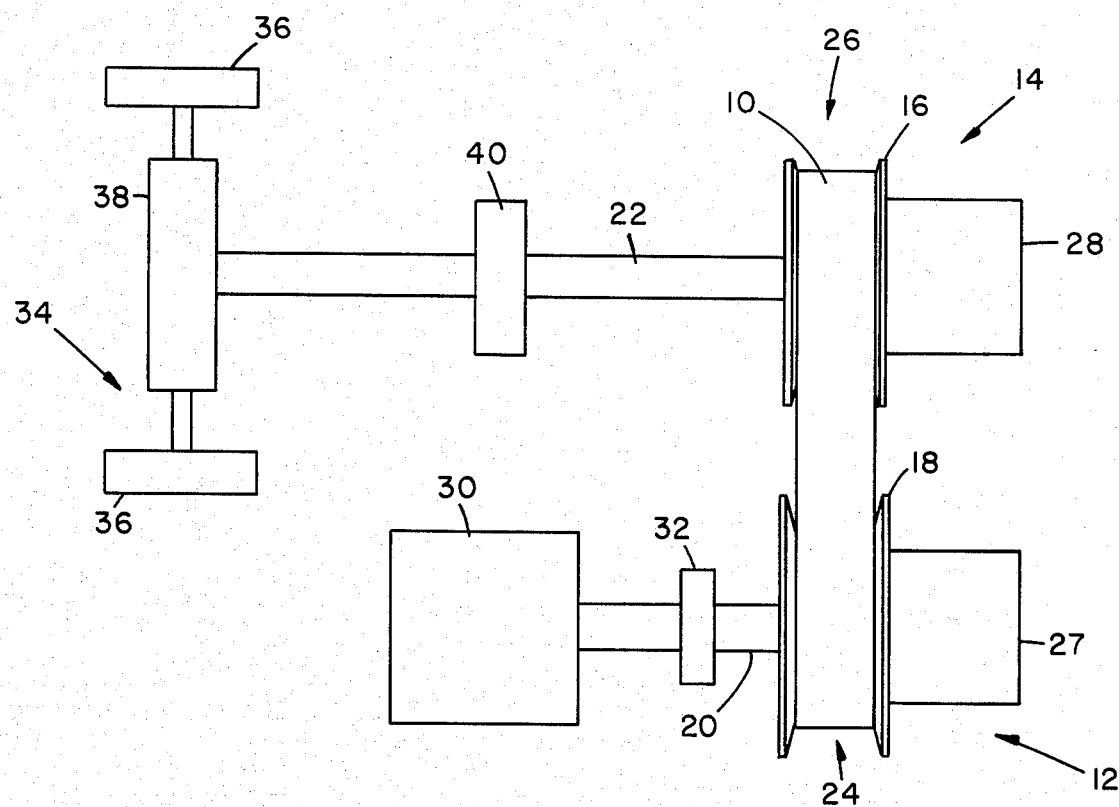
FIG. 1 is a schematic of a variable speed belt transmission according to this invention showing its interrelationship to a power source in a vehicle-type driven means with a transmission at a maximum (speed down) ratio where the driver pulley halves are axially separated to a full open position and the driven pulley halves are positioned axially together to a full closed position.
Figure 2:
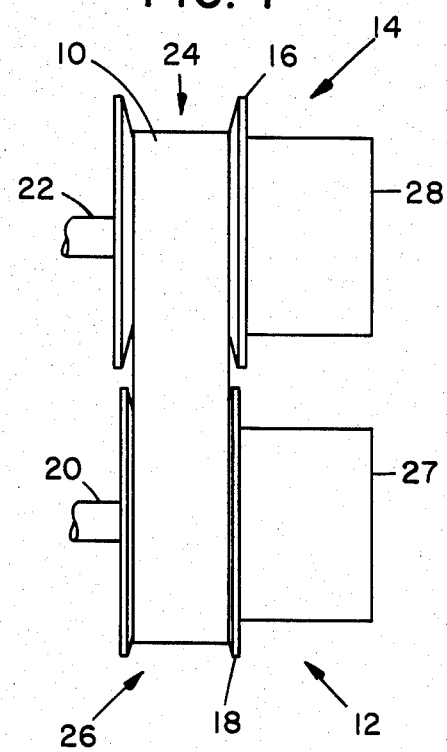
FIG. 2 is a schematic of the variable speed V-belt transmission of FIG. 1 at a minimum (speed up) ratio where the driver pulley halves are axially together to a full closed position and the driven pulley halves are axially separated to a full open position.

Referring to FIGS. 1 and 2, a V-belt 10 is entrained by driver 12 and driven 14 pulleys with each pulley having an axially separable pulley half. At least one pulley half 16, 18 of each pulley is axially movable along the shaft 20, 22 from a full open position 24 where the pulley halves have maximum axial separation, to a full closed position 26 where the pulley halves are close together. The movable pulley half of the driven pulley may be controlled from the full closed to the full open position by a variety of actuator means 27 such as a spring and torque ramp combination, and the movable pulley half of the speed sensing driver pulley is controlled from the full open to the full closed position by an actuator 28 in accordance with this invention which will later be explained. The other driver and driven pulley halves are each affixed to a shaft.

The position of the pulley halves vary from a (1) maximum (speed down) ratio where the driver pulley halves are axially separated to a full open position and the driven pulley halves are positioned axially together to a full closed position, FIG. 1, to a (2) minimum (speed up) ratio where the driver pulley halves are axially together to a full closed position and the driven pulley halves are axially separated to a full open position, FIG. 2.

The driver pulley is powered by some source 30 such as an internal combustion engine which has a peak or maximum torque output capability. Various mechanisms 32 such as gearing and clutches may be interpositioned between the power source and driver pulley. This source may have the characteristic of increasing or decreasing the input torque of the driver pulley.

The driven pulley 14 powers a work load 34 at some torque and speed. For example, the driven pulley may power the drive wheels 36 of an automotive vehicle through a differential 38. In such a case, the torque load at the driven pulley is subject to constant change. Various mechanisms 40 such as a transmission or clutch may be interpositioned between the driven pulley and its power load. Such devices may influence the torque level seen at the driven pulley.

Of course, the size of the variable speed belt drive system depends on its appliction. Once a maximum input peak torque is determined at the driver pulley, the diameters of the driver and driven pulley, center distance between pulleys, belt size and speed are established in accordance with accepted standards in practice. For example, a variable speed belt drive may be chosen to have the following characteristics:

EXAMPLE I

Peak Torque: 107 lb.-ft.
Driver Pulley Diameters: 9.8 in. max.; 4.4 in. min.
Driven Pulley Diameters: 9.8 in. max.; 4.4 in. min.
Center Distance: 10.87 in.
Belt Length: 44.71 in.
Pulley Groove Angle: 30 degrees
Speed Variation: 4.96 (2.23:1 speed down, 0.45:1 speed up)

Figure 5:
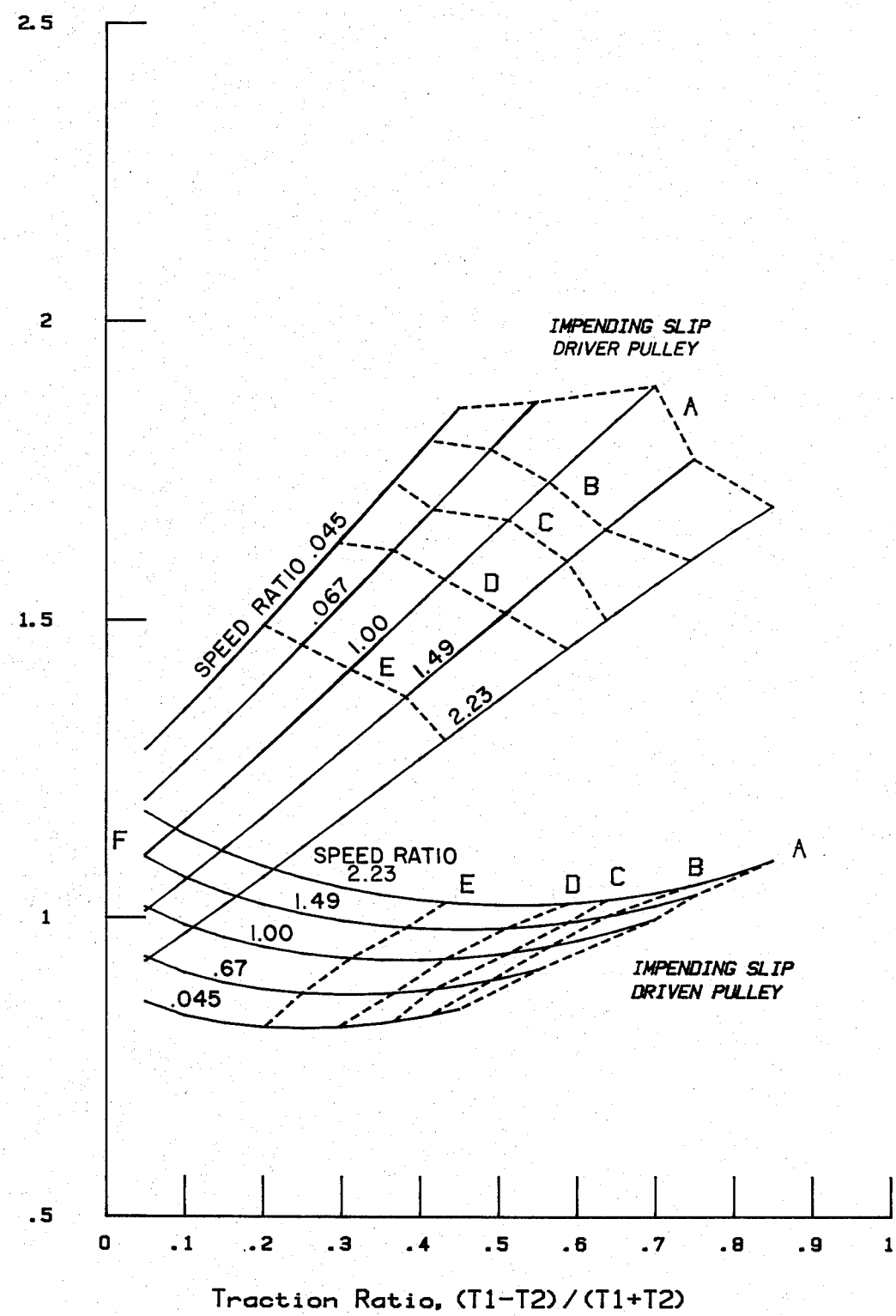
FIG. 5 is a chart showing interrelationships between traction ratio, dimensionless axial force, speed ratio, and impending slips for driver and driven pulleys of an exemplary variable speed V-belt drive.

For whatever chosen physical parameters, power at some torque at the driver pulley is transmitted to the driven pulley by means of the entrained belt. As with all V-belt drives, power is transmitted between driver and driven pulley by means of belt tension where $T_1$ is commonly referred to as the tight side belt tension and $T_2$ is commonly referred to as the belt slack side tension. The difference between $T_1$ and $T_2$ $(T_1-T_2)$, is representative of a force acting at changing pulley radii for transmitting torque between the driver and driven pulleys. Axial force distribution is drastically different between the driver and driven pulleys even though both pulleys are exposed to the same tight side and slack side belt tensions. Such axial force distribution differences are illustrated by FIG. 5.

Power is only transmitted between the pulleys when there is a difference between tight side and slack side belt tension $(T_1-T_2)$ to generate a tangential force on a pulley that acts at some radius to produce a torque. Axial forces F must be provided at the movable pulley halves to generate belt tension. FIG. 5 charts the interrelationships for driver and driven pulley axial forces, tight side and slack side belt tensions, and speed ratio for the belt drive listed in Example I. Dimensionless axial force, scaled on the ordinate, is a ratio of axial force, F, to total drive tension $(T_1+T_2)$. Traction ratio (sometimes referred to as the coefficient of traction, reference 2 supra) scaled on the abcissa, is the ratio of $(T_1-T_2)$ i.e., net force available to transmit torque, to total drive tension $(T_1+T_2)$. Speed ratio is defined as the ratio of driver pulley rpm to driven pulley rpm. The driven pulley dimensionless axial forces fall in a somewhat narrow band that is generally parallel to the traction ratio abcissa for all speed ratios. Thus, driven pulley dimensionless axial force is substantially constant for all drive torques (from a traction ratio 0 to a traction of about 0.85). Accordingly and for the Example, the driven pulley axial force can be thought of as setting the drive tension in such a manner that it establishes total drive tension for all ranges of torque. In contrast, the required axial force at the driver pulley increases with traction ratio and decreasing speed ratio.

Thus, an ideal axial force line at the driven pulley can be determined from the various input torques associated with the peak torque at the driver pulley. Torque varies for a fixed value of $(T_1-T_2)$ because pulley radii vary between the driver and driven pulleys as the various speed ratios are effected. For Example I, assume driver pulley torque drive 107 lb.-ft. is transmitted to the driven pulley at a 1:1 speed ratio. Torque is 238.5 lb.-ft. at the maximum speed ratio and 48.1 lb./ft. at the minimum speed ratio where the total variation of assumed speed ratio is 4.96.

Figure 3:
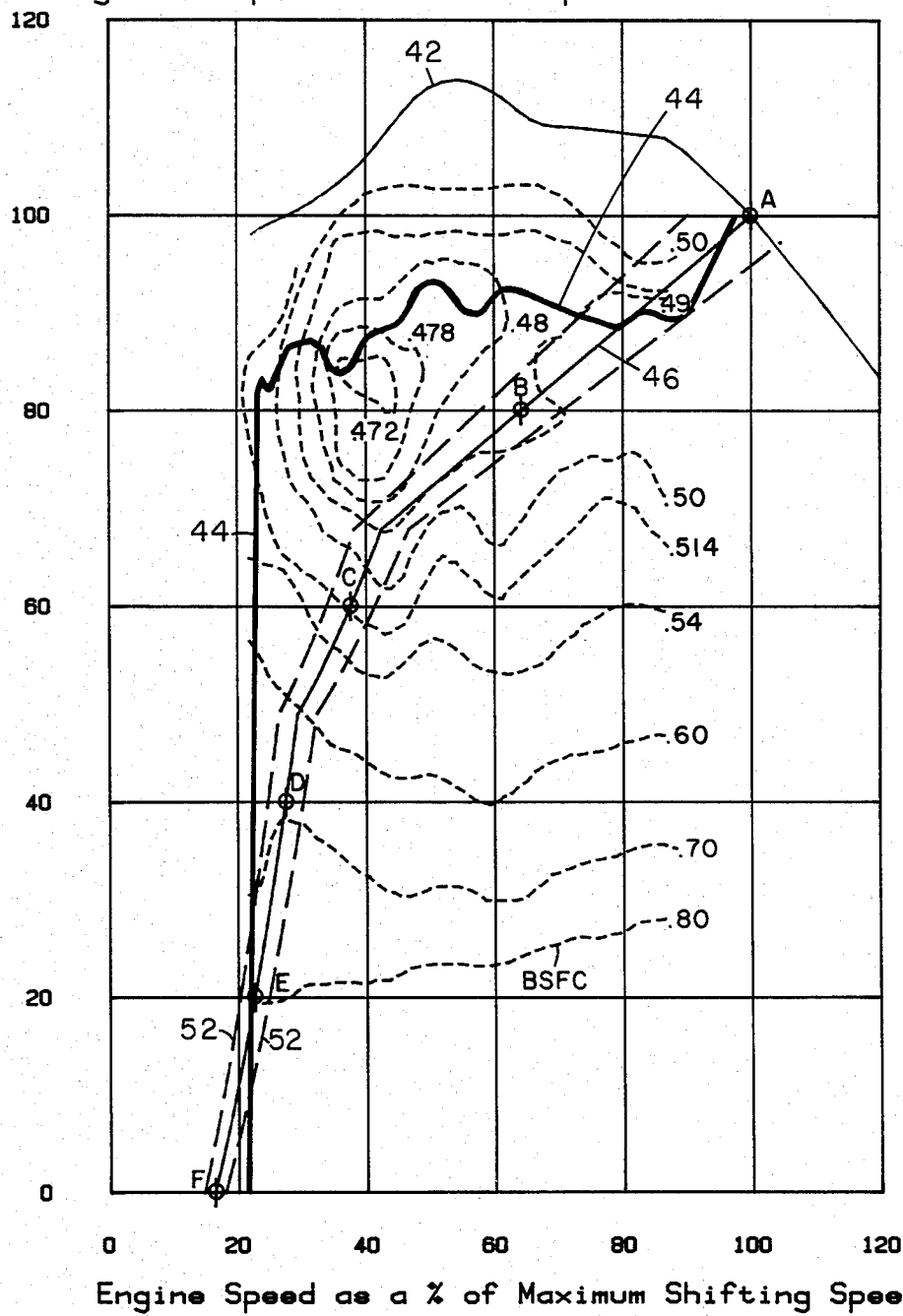
FIG. 3 is a chart showing interrelationships between (1) engine speed as a percent of maximum shifting speed (2) engine torque as a percent of maximum power torque, and (3) brake specific fuel consumption (BSFC) for an example engine.

Referring to FIG. 3, brake specific fuel consumption (BSFC) for an internal combustion engine is charted to show its interrelationship with engine torque, including wide open throttle torque 42, and engine speed. The BSFC lines somewhat resemble a topographical map where the lower number BSFC lines represent valleys and the higher number BSFC lines represent peaks. An ideal path through the valleys is corresponds to the lowest fuel consumption at any given engine power. As shown, the ideal path 44 is not monotonic (i.e., does not have an always positive slope). The ideal path has several inflection points and negative slopes. An operating line 46 montonic in torque with points A, B, C, D, E, F, is chosen which comes close to the valleys but has slope from about 0.004 lb-ft/rpm to about 0.060 lb-ft/rpm for mechanical sensing and actuation For the parameters of Example 1, point A, FIG. 3, is representative of an engine having a peak torque of 74 lb.-ft. (100%) at an engine speed of 4,600 rpm (100%). Through a drop box gearing device 32, the engine peak torque of 74 lb.-ft. is increased to 107 lb.-ft. of torque at the driver pulley. In Example 1, 107 lb.-ft is the peak torque which the driven pulley is designed to handle with actuator forces that substantially preclude belt slip. The driven pulley responds to monotomic torque variations as reflected in $(T_1-T_2)$, driven pulley axial forces, and actuator displacement (i.e., pulley diameter). That is, the driven pulley only responds to torque.

Of course, the driven pulley actuator cannot sense the exact torque and respond with a theoretically precise axial closing force. There is some tolerance on torque sensitivity. Whatever the torque sensitivity or excess driven pulley axial force above a required axial force to inhibit belt slip, the driven pulley axial force must be matched in a force balance by the speed sensing driver pulley actuator through the entrained V-belt. If perfectly done, there would be an operating line of zero width reflecting constant speed, constant power, and constant engine throttle position. In reality, V-belt transmissions do not shift in such a manner as to operate on a perfect operating line, but rather, they operate within a zone around a perfect operating line. A goal of the invention is to reduce the zone around the operating line while using a primarily mechanical speed sensing driver pulley actuator. The speed sensing driver pulley plays a primary role in making the transmission shift within a chosen zone line.

Figure 4:
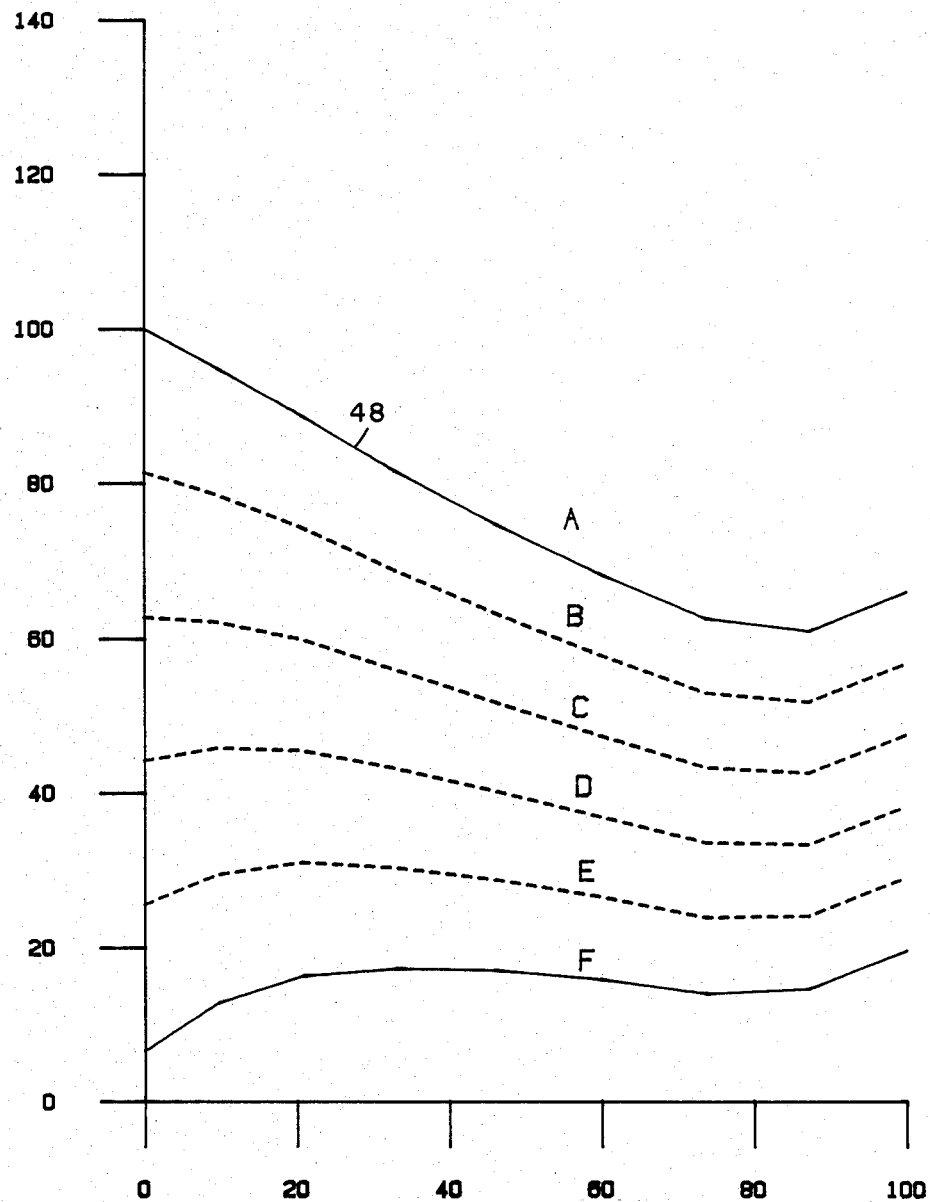
FIG. 4 is a chart showing interrelationships between (1) driven pulley axial force, (2) levels as percentages of a required maximum force and speed variation (separation of the driven pulley halves is expressed as pulley displacement from downshift) for an exemplary variable speed V-belt drive of the invention.

Referring to FIG. 4, an axial force 48, level A, is generated by the driven pulley actuator, which force is sufficient to substantially prevent belt slipping at the designed driver pulley peak torque. Preferably, the axial force, line A, generally decreases from the driven pulley full closed position to the driven pulley full open position to minimize total belt tension $(T_1+T_2)$ for improved belt life. The axial force level A shown in FIG. 4, is for the drive parameters of Example I. An extended family of axial force levels B, C, D, E, F is interpolated from zero axial force to the maximum force level A. The levels are at 20% increments and correspond to 20% increments of driver pulley maximum torque.

As indicated by FIG. 5, dimensionless axial force at the driver pulley for all speed ratios is generaly greater than the dimensionless axial force at the driven pulley except at low traction ratios. For any chosen traction ratio point at the driven pulley, there is a corresponding traction ratio point at the driver pulley. Thus, for the 20% increment traction ratio levels A, B, C, D, E, F at the driven pulley there are corresponding 20% increment traction ratio levels A, B, C, D, E, F at the driver pulley. This interrelationship aids in defining the requirement for generally decreasing axial force lines at the driver pulley.

Figure 6:
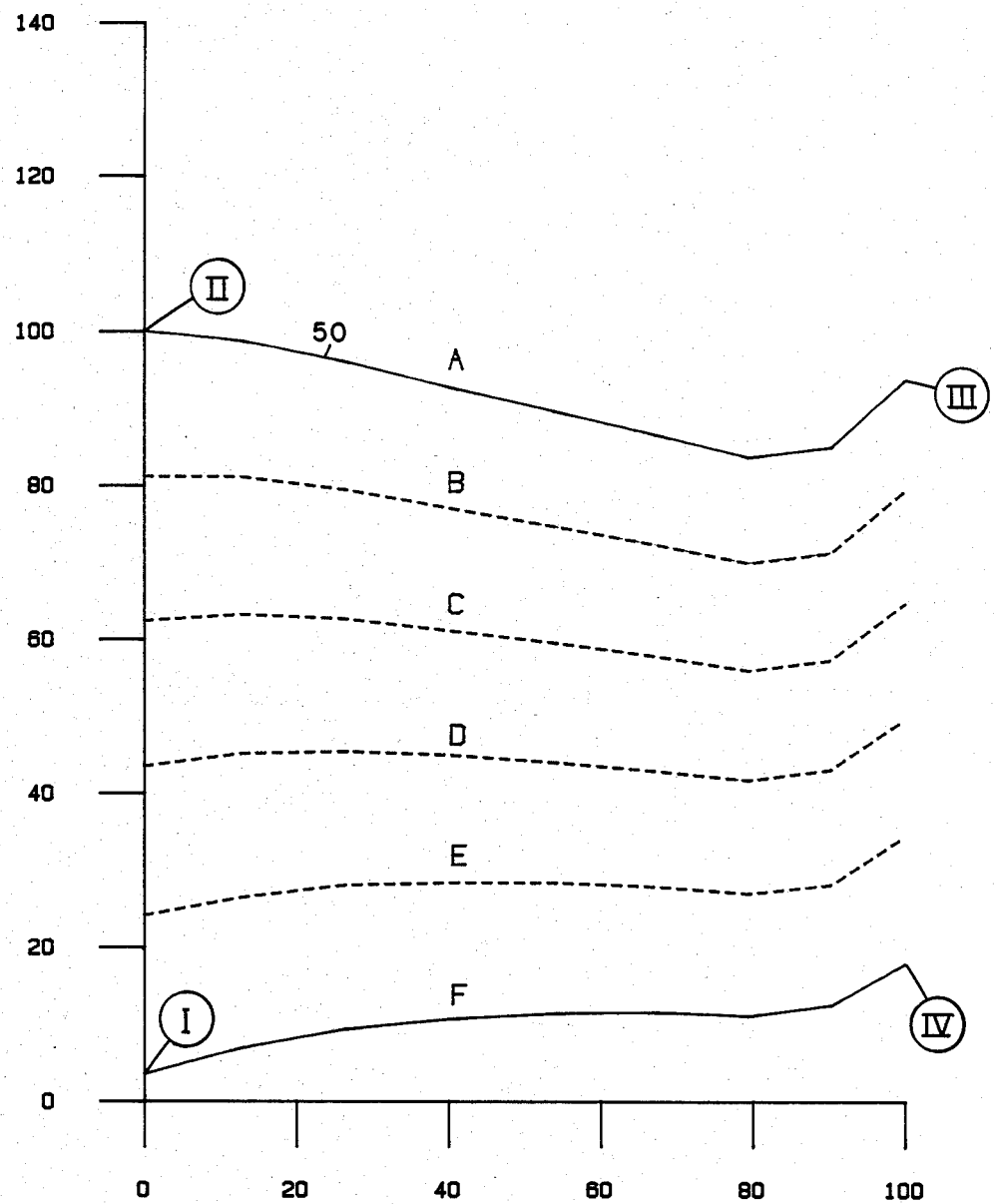
FIG. 6 is a chart showing interrelationships (1) between driver pulley axial force levels as percentages of a required maximum force, and (2), speed variation (separation of the driver pulley halves is expressed as pulley displacement from downshift), for driver pulley to driven pulley axial force matching for an exemplary variable speed V-belt drive of the invention.

FIG. 6 charts driver pulley axial force 50 at level A as well as 20% increment levels A, B, C, D, E, F that correspond to counterpart levels A, B, C, D, E, F at the driven pulley, FIG. 4. Corresponding levels A, B, C, D, E, F of FIGS. 4 and 6 are shown as points A, B, C, D, E, F on the operating line of FIG. 3 and traction ratio levels A, B, C, D, E, F, on FIG. 5.

The driver pulley actuator speed sensing mechanism is sized or balanced as for example at point B, FIG. 3 such that at 63% of engine speed, the engine is producing 80% of its maximum torque. Similarly, the driver pulley actuator is designed to meet points C, D, E, F, FIG. 3 on the operating line in conjunction with a force balance through the belt with the driven pulley. Therefore, the axial force, pulley displacement conditions representing level A of FIG. 6 must occur at the torque and speed as represented by point A of FIG. 3. The same is true for levels B, C, D, E, F of FIG. 6 and points B, C, D, E, F of FIG. 3. The interrelationship between engine speed and actuator axial force is charted in FIG. 7 to show a theoretical axial force for various speed ratios and counterpart levels A, B, C, D, E, F, to FIGS. 3, 4, 5 and 6.

Figure 8:
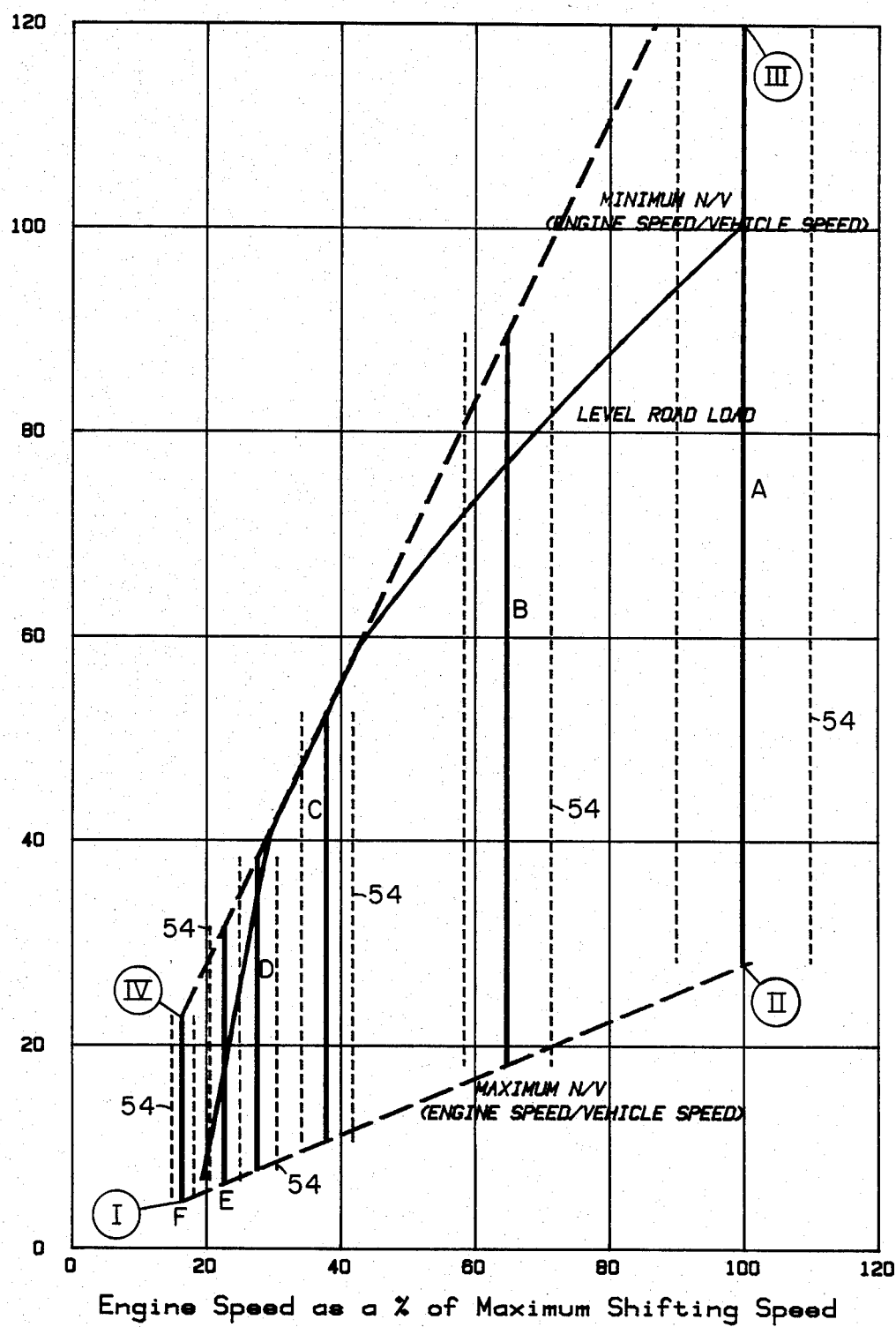
FIG. 8 is a chart showing interrelationships between engine speed and vehicle speed with constant speed shifting lines (A,B,C,D,E,F) between maximum and minimum N/V engine-speed to vehicle speed ratios.

When the driver pulley and driven pulley actuators are matched in a force balance as above described, the transmission will approach shifting at a constant speed for various torque levels as represented by lines A, B, C, D, E, F on FIG. 8. Shifting along line A corresponds to driver pulley axial force A, driven pulley axial force A, and maximum torque point A of the operating line. Similarly, shifting lines B, C, D, E, F are so corresponding. Any imperfections in matching the driver and driven pulley actuation forces through an entrained belt shows up as an rpm zone around the operating line. In accordance with this invention, the transmission shifts in a rpm zone 52 of about 10 percent of the shifting speed, around the operating line, and more preferably, the transmission shifts within a zone about 5 percent (FIG. 3). This also corresponds to the 10 percent shifting zones 54 for each of the shifting lines of FIG. 8. Comparatively, prior art transmissions with mechanical speed sensing actuators at the driver pulley shift in a greater zone from about 10 percent to as high as 50 percent around an operating line at the shifting speed.

Figure 7:
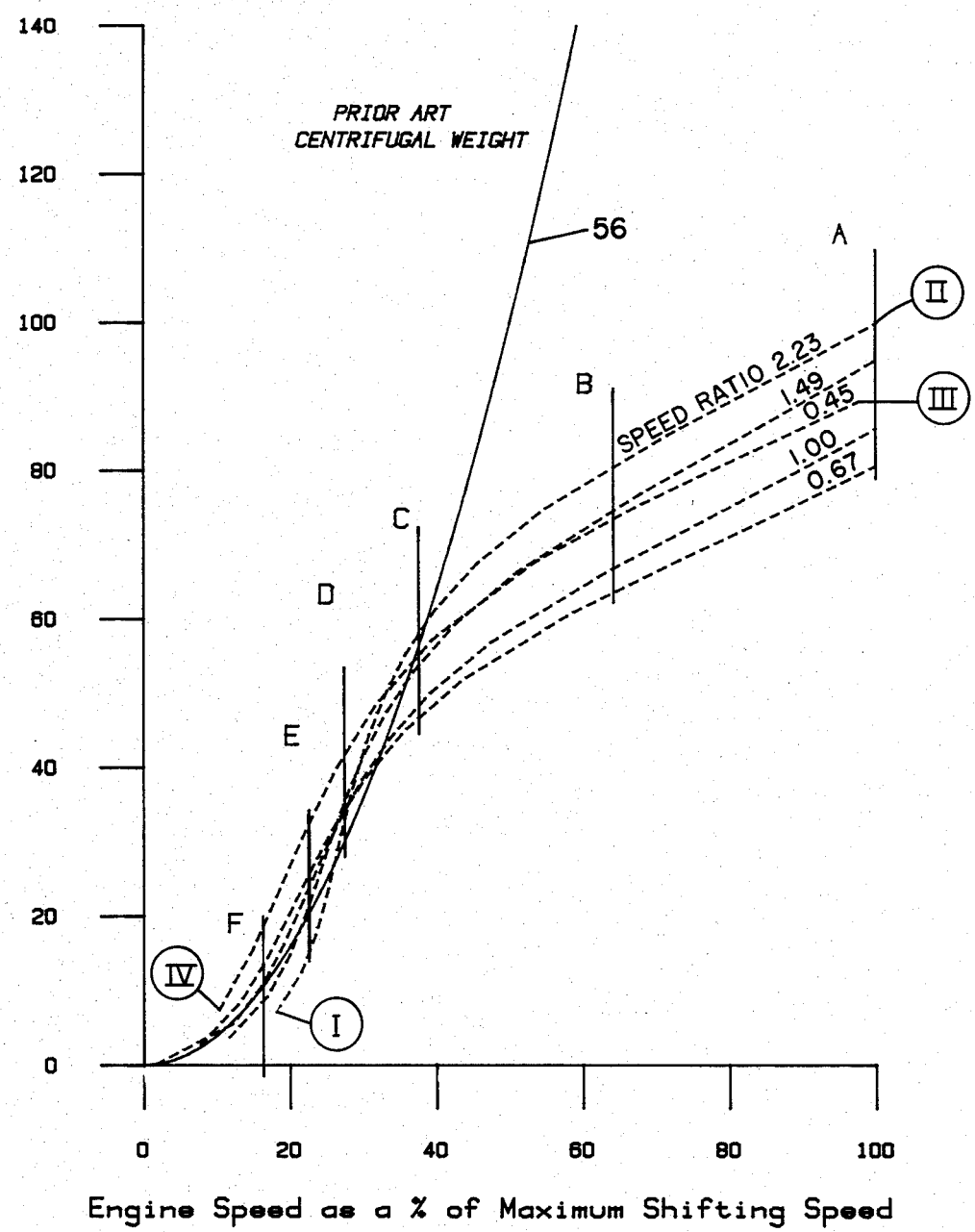
FIG. 7 is a chart showing the relationship between (1) driver pulley axial force as a percent of maximum force and (2) engine speed as a percentage of maximum shifting speed at various speed ratios and axial force levels.

Referring to FIG. 6, the driver pulley force actuation lines vary from somewhat of a constant to somewhat of a decreasing value from the driver pulley full closed to driver pulley full open position. In contrast, a simple centrifugal weight speed sensing actuator produces an axial force that is proportional to the square of the speed which is shown as a parabolic curve 56 that is significantly different from the axial force lines as shown in FIG. 7. The method of providing the driver pulley axial forces that are similar to those required according to FIG. 7, is achieved by winding one end of a torque producing spring such as a clock type torsional spring, with a speed sensing, centrifugal weight. The other end of the spring is operatively connected to axially reciprocate a movable half of the speed sensing pulley which is explained in conjunction with apparatus of the invention.

Apparatus

The apparatus aspects of the invention substantially follow the teachings of the above described method. The drive system schematically represented by FIGS. 1 and 2 has a speed sensing driver pulley and a torque sensing driven pulley where both pulleys have at least one movable pulley half that is axially positioned by means of an actuator to effect a desired speed ratio. Any desired type of actuator may be used at the driven pulley. Preferably the actuator includes torque sensing to maximize belt life. An example of a torque sensing actuator that provides axial forces that generally decrease from a driven pulley full closed position to the driven pulley full opened position appears in U.S. application Ser. No. 335,981.

Figure 9:
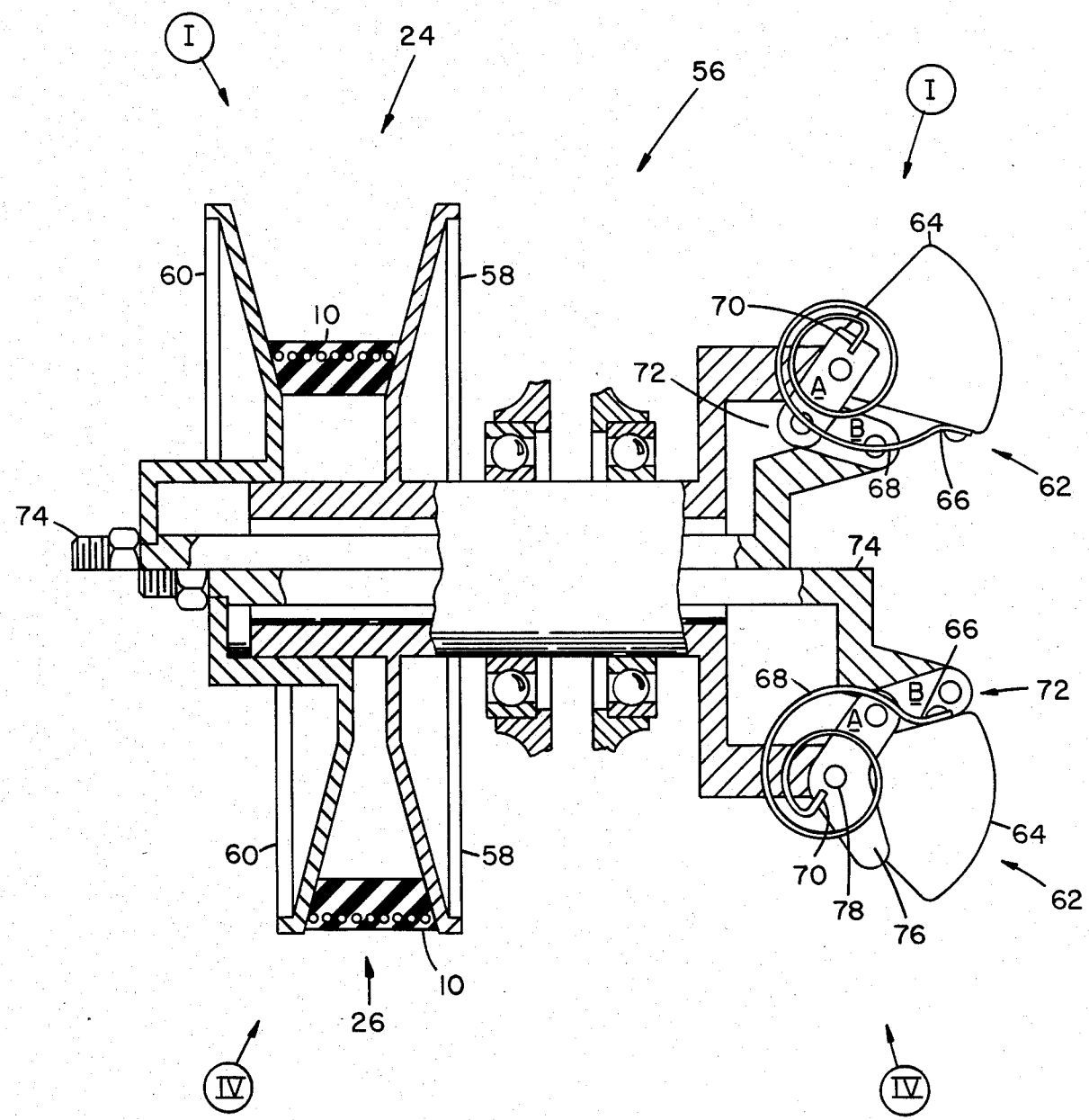
FIG. 9 is a split axial, partially cross-sectional view of a driver pulley with an actuator of the invention showing the position for articulated linkage and centrifugal weights at low speed with pulley halves separated for a speed-down condition (top half of FIG. 9) and the pulley halves together for a speed up condition (bottom half of FIG. 9)
Figure 10:
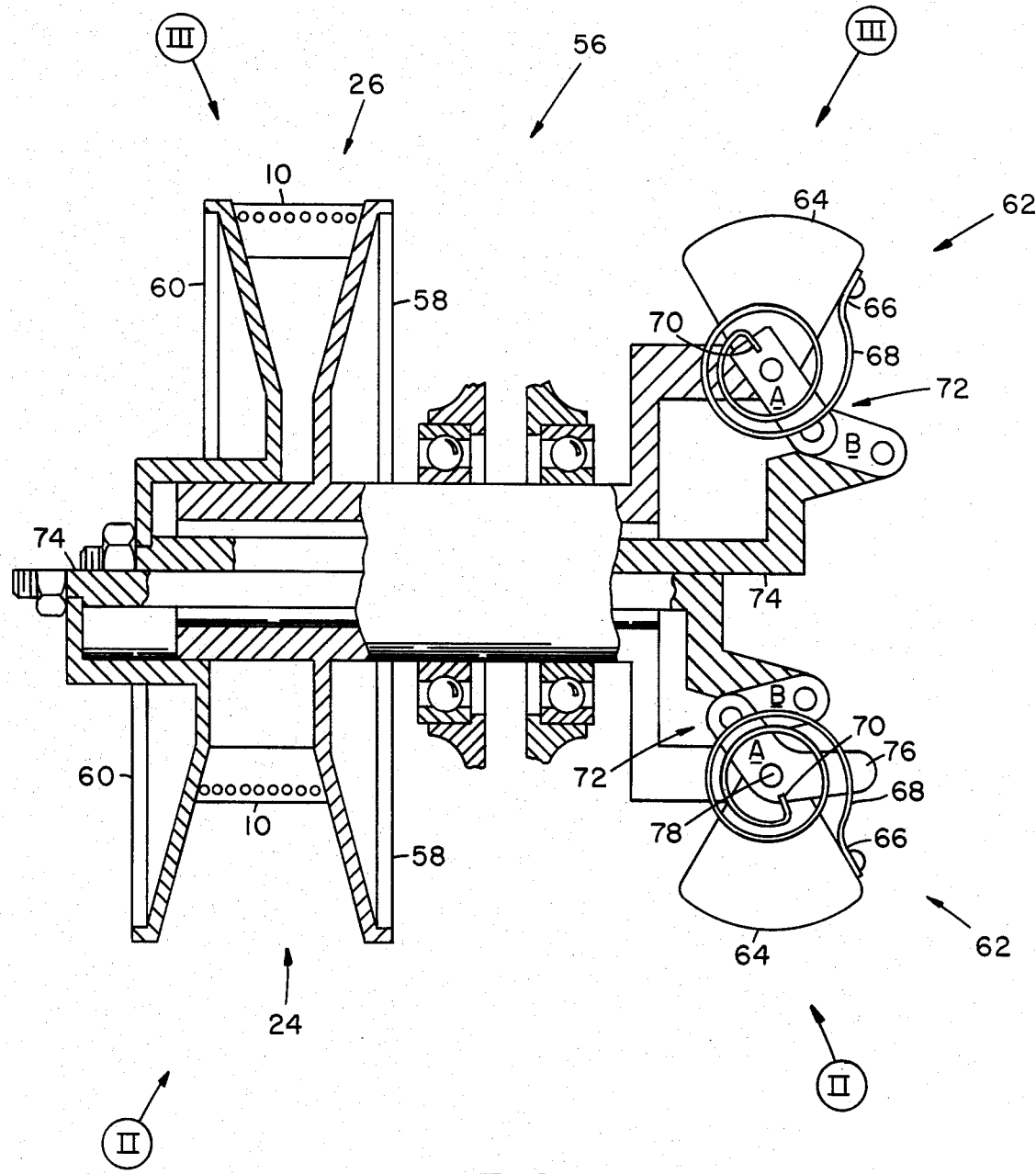
FIG. 10 is a view similar to FIG. 9 but showing the position for articulated linkage and centrifugal weights at high speed with pulley halves together for a speed up condition (top half of FIG. 10) and the pulley halves separated for a speed down condition (bottom half of FIG. 10).

Referring to FIGS. 9 and 10, a speed sensing pulley 56 has a fixed pulley half 58 and a movable pulley half 60 where the movable pulley half is positioned from a full closed position 26 to an axially full open position by means of a speed sensing actuator 62. An entrained belt 10, under tension, operatively aids positioning the movable pulley half toward the open position.

The movable pulley half 60 is biased toward the closed position 26 by one or more centrifugal fly weights that are connected to wind up one end 66 of a torque producing spring such as a volutely wound clock spring 68. The other end 70 of the spring is connected to an articulated linkage 72, with links A, B, to axially reciprocate the movable pulley half by means of a rod 74. Winding the spring with the centrifugal weight increases the spring force so that the articulated linkage is biased to move to close the pulley. A secondary centrifugal weight 76 may be added to the articulated linkage to further increase axial force after a predetermined rotation of the linkage about a pivot point such as to initiate their effectiveness on axial force at about 40 percent of peak shifting.

The primary centrifugal weights, secondary centrifugal weights and springs operate between four extreme conditions I, II, III, IV, of speed and speed ratio to produce variable axial forces in the manner shown in FIGS. 6, 7 and 8. Starting at level F, FIGS. 6, 7 and 8, at the pulley full open position, the centrifugal weights are radially inward FIG. 9, condition I, so that the only force on the mechanism operating to close the pulley is an optional, but not used in the Example, preload on the torque producing springs. As the driver pulley speed increases, the centrifugal weights rotate to their extreme radial outward position FIG. 10, condition II, which winds the spring, increasing the closing axial force to level A at the driver pulley full open position. Changing belt force as effected by an imbalance between the pulleys, causes the driver pulley to close with the centrifugal weights radially extended, Upshifting the pulleys to achieve a force balance unwinds the spring giving a desired reduction in axial force to condition III, FIG. 10, as respresented at level A where the axial displacement of the driver pulley is full closed. Should the rotational speed drop significantly, the centrifugal weights move radially inward changing the axial force to a condition IV FIG. 9, at level F where the pulley is still full closed. Of course, the centrifugal effect of the mass of the articulated linkage must be considered as it moves from the full closed to the full opened position. For example, the increase in axial force at level A from about 80 to 100 percent full closed is effected by the linkage being arranged to approach a toggle overcenter condition at the 100 percent closed position. The extreme conditions I, II, III, IV are indicated on FIGS. 6, 7, 8, 9 and 10.

The above method and apparatus show how a predominantly mechanical speed sensing actuator can be used to control transmission shifting to fall within a 10 percent zone about a chosen operating line on an engine BSFC, torque, rpm map.

The transmission as described herein only responds to speed and torque. Changes in engine torque-speed performance changes the shifting speed for the transmission.

The foregoing detailed description is made for illustration only and it is not intended to limit the scope of the invention which is to be determined from the appended claims.

What is claimed is:

1. A method for operating a driver pulley of a belt driven transmission in conjunction with an engine characterized by charted interrelationships between engine speed, engine torque and brake specific fuel consumption (BSFC); the transmission of the type with a driven pulley having axially separable pulley halves responsively operable to axial forces variable with engine speed for closing the driver pulley halves together; a V-belt entrained by the driver and driven pulleys; the driven pulley axial forces and driven axial forces cooperatively causing variable belt tensions for transmitting predetermined power loads between the driver and driven pulleys from (1) a maximum (speed down) ratio where the driver pulley halves are axially separated to a full open position and the driven pulley halves are positioned axially together to a full closed position by means of an actuator to (2) a minimum (speed up) ratio where the driver pulley halves are axially together to a full closed position and the driven pulley halves are axially separated to a full open position; comprising the steps of:

selecting a desired operating line for the transmission from the charted engine interrelationships where the line is monotonic in torque and has a slope from about 0.004 lb.-ft/rpm to about 0.060 lb.-ft/rpm;

determining the maximum torque at the driver pulley;

determining a family of driven pulley axial forces based on the maximum torque at the driver pulley;

determining a family of required driver pulley axial forces for traction ratio equilibrium of the driver and driven pulleys at selected torques on the operating line;

determining the speeds at which driver pulley axial forces for equilibrium are required to meet the selected torques on the operating line;

providing the required driver pulley axial forces by means of a torsional spring with a centrifugal weight attached to one end of the spring and an articulated linkage operatively interconnected to the other end of the torsional spring, the axial forces provided by winding the torsional spring and biasing the axial force to close the driver pulley.

2. The method as claimed in claim 1 and further including the step of increasing the axial force to close the driver pulley by means of a secondary centrifugal weight operatively connected directly to the articulated linkage.

3. A variable speed pulley comprising:
a rotatable shaft;
a fixed pulley half that is coaxial and fixedly attached to rotate with said shaft;
a movable pulley half that is coaxial with and axially reciprocative along said shaft;
at least one centrifugal weight;
means for supporting the centrifugal weight to rotate with the shaft and pivot;
an articulated linkage;
means for connecting the articulated linkage to the movable pulley half; and
a torque producing spring having a first end operatively connected to the centrifugal weight and a second end operatively connected to the articulated linkage.

4. The variable speed pulley as claimed in claim 3 wherein a secondary centrifugal weight is attached to the articulated linkage.

5. The variable speed pulley as claimed in claim 3 wherein torque producing spring is a volutely wound clock spring.

* * * * *